UNITED STATES PATENT OFFICE.

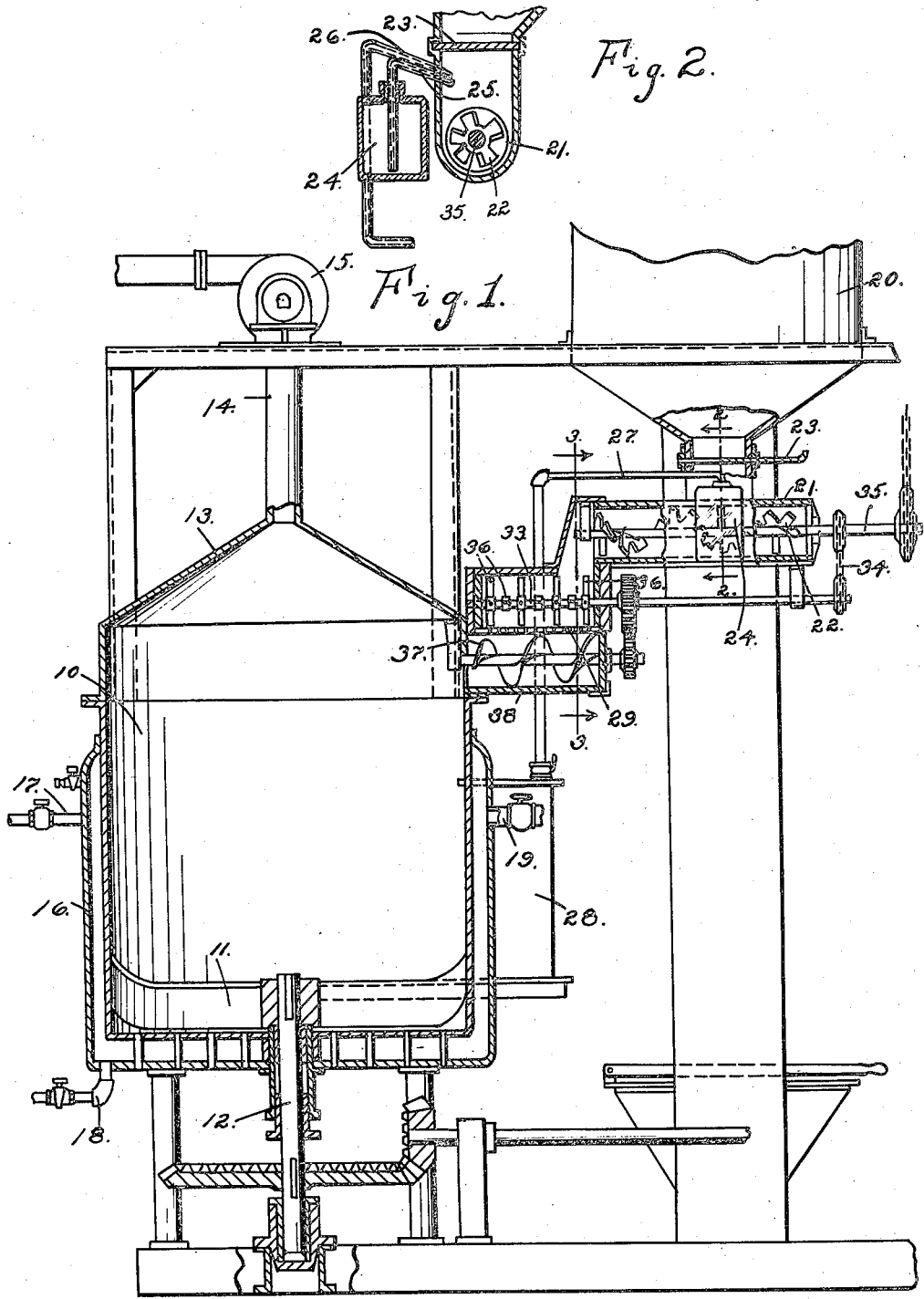

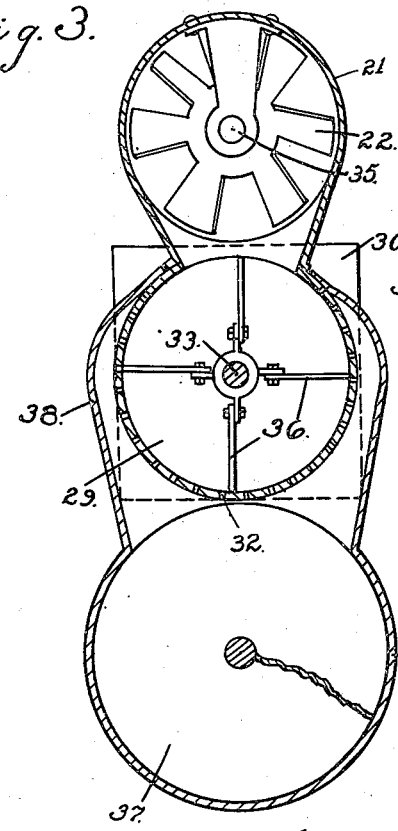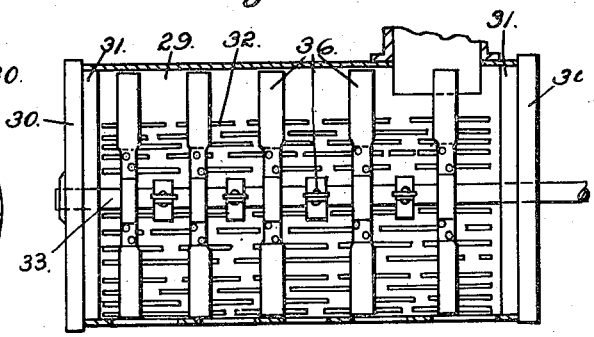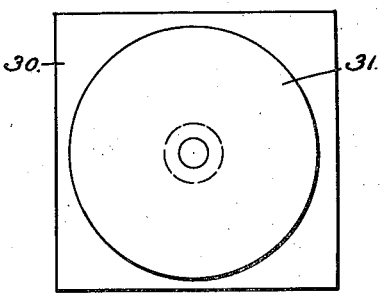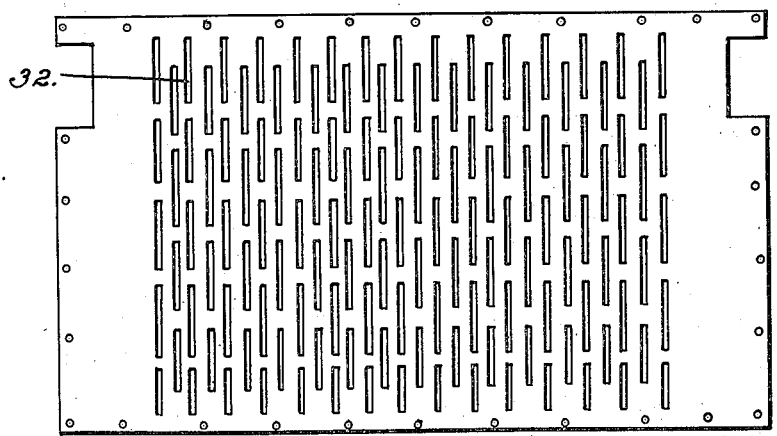

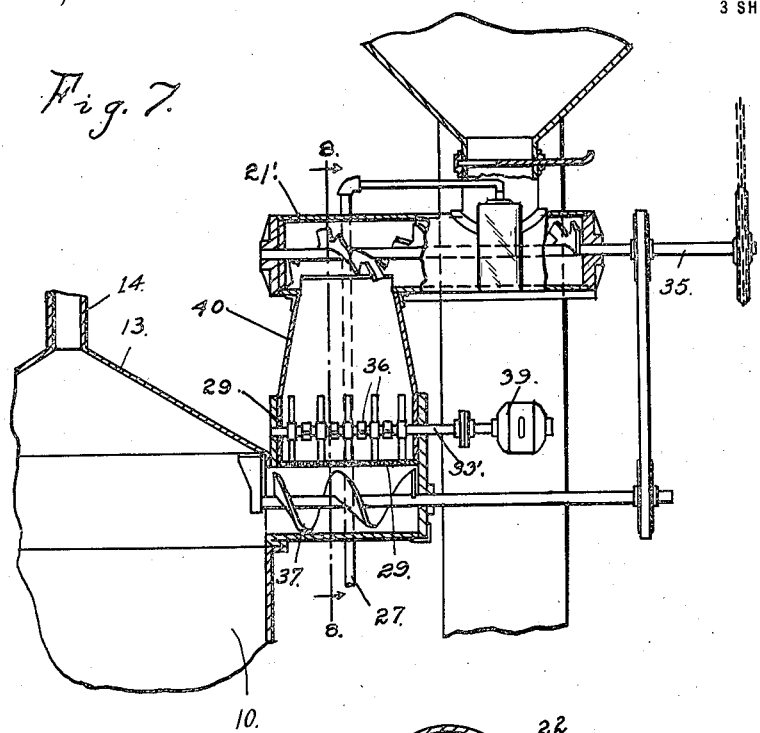
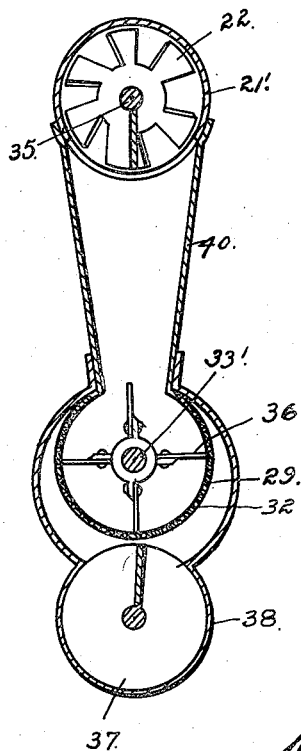

ADOLPH W. H. LENDERS, OF CEDAR RAPIDS, IOWA.

APPARATUS FOR MAKING MODIFIED STARCHES.

1,191,324.  Specification of Letters Patent.  Patented July 18, 1916.

Application filed September 17, 1915. Serial No. 51,258.

*To all whom it may concern:*

Be it known that I, ADOLPH W. H. LENDERS, a citizen of the United States, residing at Cedar Rapids, in the county of Linn and State of Iowa, have invented certain new and useful Improvements in Apparatus for Making Modified Starches, of which the following is a specification.

My invention relates to the manufacture of modified starches such as soluble starch, thin boiling starch, dextrin, British gum, and other conversion or partial conversion products; and the principal object of the invention is to provide as an improvement in apparatus for the manufacture of products of this class, means whereby the acidulation of the starch prior to the conversion step is performed more uniformly, effectively and completely with the result that a better and more uniform product is obtained than has been possible with the apparatuses heretofore used.

A further specific object of the invention is to provide an improvement, in this respect, upon the apparatus disclosed and claimed in my co-pending application Serial No. 766,332, filed May 8, 1913.

The improvement in the apparatus for making modified starches which is the subject matter of the present application, is disclosed in my co-pending application Serial No. 847,280, filed June 25, 1914, which application relates to a method of making modified starches and contains no claims to the apparatus as such.

The invention is illustrated, in certain preferred embodiments, in the accompanying drawings, wherein—

Figure 1 is a sectional elevation of an apparatus for making modified starches constructed in accordance with my invention. Fig. 2 is a detail sectional view on line 2—2 of Fig. 1. Fig. 3 is a similar view, taken on an enlarged scale, on line 3—3 of Fig. 1. Fig. 4 is a longitudinal sectional view of the acidulating drum. Fig. 5 is a detail view of one of the heads of the drum. Fig. 6 is a developed view of the body of the drum. Fig. 7 is a fragmentary sectional elevation showing a modification, and Fig. 8 is a sectional view taken on line 8—8 of Fig. 7.

Like characters of reference designate like parts in the several figures of the drawings.

Referring first to Figs. 1 to 6 inclusive, of the drawings, 10 is a converting or dextrinizing vessel provided with stirring blades 11 carried on a shaft 12 which is rotated in any suitable manner. The dextrinizing vessel is preferably provided with a hood 13 having an exhaust pipe 14 in which is arranged a fan 15. The vessel is provided with a jacket 16 supplied with steam through steam pipe 17 and with water through pipe 18. The outlet pipe for the jacket is shown at 19. 20 is a storage bin for starch which is arranged above a screw conveyer 21, the flight 22 of which is preferably notched. The flow of starch from the bin to the conveyer is regulated by a slide valve 23. 24 is a vessel containing any suitable acid, such, for example, as hydrochloric acid. The vessel is provided with a nozzle 25 which projects into the casing of conveyer 21. 26 is an air nozzle arranged in close proximity to the acid nozzle 25 and connected by a pipe 27 with an air reservoir 28 in which air under pressure is maintained by any suitable compressor (not shown). By these arrangements acid is sprayed upon the starch in the conveyer 21. The conveyer mixes the acid and starch, its flight being notched with this in view. The acidulation of the starch is made more complete and uniform by the next step to which the material is subjected. The starch and acid, after the preliminary mixing in the conveyer 21, are delivered into a drum 29 consisting preferably of a sheet of metal (Fig. 6) bent into the form of a cylinder and inclosed at opposite ends by heads 30 formed with circular bosses 31 to which the ends of the cylindrical body of the drum are secured. The body of the drum is formed with a plurality of perforations. Preferably, though not necessarily, these perforations consist of narrow slits 32 arranged in staggered relation and extending longitudinally of the drum. Within the drum is a shaft 33 driven by a chain and sprocket connection 34 from the shaft 35 of conveyer 21. On the shaft 33 are a plurality of radially disposed beaters 36, the ends of which extend close to the inner surface of the drum. The beaters subject the acid and starch to a further mixing operation and operate to force the acidulated starch through the slits 32. By the above described operation the acidulation of the starch is very complete and uniform. Arranged below the drum 29 is a screw conveyer 37 the casing of which is, in the construction shown, a continuation of a housing 38 surrounding the drum. The screw conveyer delivers the acidulated starch into the upper end of the dextrinizing vessel 10.

In the modification shown in Figs. 7 and 8 the shaft 33' carrying the beaters is driven by a separate motor 39. This is desirable because the best results are obtained by driving the beater at a much higher rate of speed than the conveyers are driven. For example, it should be revolved at from eight hundred to thirteen hundred revolutions per minute.

In the modified construction the perforated drum 29' is arranged directly under one end of the conveyer 21' the drum being formed with an extension 40 which is secured to the under side of the casing of conveyer 21.

Operation: The starch is fed continuously into the conveyer 21 from the bin 20, the amount being regulated by slide valve 23 or other suitable means. The acid is introduced in the form of a fine spray through nozzle 25. The preliminary mixing is accomplished by means of the conveyer 21. The starch and acid are further mixed in the drum 29, the operation being completed when the material is forced through the slits 32. When a batch of the acidulated starch in sufficient quantity has been introduced into the dextrinizing vessel the steam is turned into the jacket, or this may be done while the starch is being introduced into the vessel. The material is kept in agitation by the blades 11 and the vapors are preferably drawn off by fan 15 in the exhaust pipe 14. When the proper degree of conversion has been reached the steam is shut off and water introduced into the jacket through pipe 18, the water outflowing through pipe 19. This stops the process of conversion almost instantaneously. The degree to which the conversion is carried will, of course, depend upon the nature of the product required.

While I have illustrated and described my invention as an improvement upon the particular form of dextrinizing apparatus disclosed in my co-pending application Serial No. 766,332, referred to above, the means for producing uniform and homogeneous acidulation of the starch prior to conversion which my invention provides, might be employed in connection with apparatus for making modified starches of quite different construction. The invention is, I apprehend, also susceptible of physical embodiment different from that shown and described herein. Therefore I do not wish to be understood as limiting the invention to the particular constructions, arrangements and devices shown and described except so far as the claims are specifically so limited.

Complete and uniform acidulation of the starch is essential if a pure, uniform and homogeneous product is to be produced. The dextrin, for example, which has been manufactured according to processes heretofore practised, has always contained a certain quantity, varying for different batches, of black specks. These are the result of certain of the starch particles being over acidulated and for that reason over dextrinized or charred. It is highly desirable that dextrin should be produced entirely free from such black specks as they are detrimental to the quality of the product even when, as sometimes happens, they are so fine as not to be readily detected by mere inspection. By employing the means hereinabove described for acidulating the starch, the acidulation is so complete and uniform that it is possible to produce a product which is uniformly converted throughout and is perfectly white in color, containing none of the black specks or other impurities characteristic of the ordinary commercially produced dextrins or like products.

I claim:

1. An apparatus for manufacturing modified starches, means for acidulating the starch comprising a hollow element having a perforated wall, means for mixing together starch and an acid in uniform proportions, and means for forcing the material through the perforated wall of said hollow element.

2. In apparatus for manufacturing modified starches, means for acidulating the starch comprising a hollow element the wall of which is formed with narrow slits, means for mixing together starch and an acid in uniform proportions, and means for forcing the material through the slits in the wall of said hollow element.

3. In apparatus for manufacturing modified starches, means for acidulating the starch comprising a hollow element having a perforated wall, means for mixing together starch and an acid in uniform proportions, and rotary beaters within said hollow element which revolve at a high speed and force the material through said perforations.

4. In apparatus for manufacturing modified starches, means for acidulating the starch comprising a hollow element the wall of which is formed with narrow slits, means for mixing together starch and an acid in uniform proportions, and rotary beaters within said hollow elements which further mix the particles of starch with the acid and force the material through said slits.

5. In apparatus for manufacturing modified starches, means for acidulating the starch comprising a perforated element, means for mixing starch and an acid together and delivering the same to said perforated element, and means for forcing the material through the perforations in said element.

6. In apparatus for manufacturing modified starches means for acidulating the starch comprising an element formed with narrow slits, means for mixing starch and an acid together in uniform proportions and delivering the same to said element, and means for forcing the material through the slits therein.

7. In apparatus for manufacturing modified starches, means for acidulating the starch comprising a cylindrical drum, the wall of which is perforated, means for mixing and delivering starch and an acid in regulated proportions into said drum, a shaft in the drum, beaters arranged on said shaft with their extremities close to the wall of the drum, and driving means for revolving said beaters at high speed.

8. In apparatus for manufacturing modified starches, means for acidulating the starch comprising a cylindrical drum formed with narrow slits, means for mixing and delivering the starch and an acid in regulated proportions into said drum, a shaft in the drum, and beaters arranged on said shaft with their extremities close to the wall of the drum.

9. In apparatus for manufacturing modified starches, means for acidulating the starch comprising a cylindrical drum formed with a plurality of narrow slits extending longitudinally of the drum and in staggered relation, means for delivering the starch and an acid into said drum, a shaft in the drum, and beaters arranged on said shaft with their extremities close to the wall of the drum.

10. In apparatus for manufacturing modified starches, the combination of a dextrinizing vessel, a conveying and mixing device, means for introducing acid and starch into the conveying and mixing device, a drum arranged to receive the acidulated starch from said conveying and mixing device formed with perforations, means within the drum for forcing the acidulated starch out through the perforations of the drum, and means for conveying the material so treated to the dextrinizing vessel.

11. In apparatus for manufacturing modified starches, the combination of a dextrinizing vessel, a combined conveying and mixing device, means for introducing starch into said conveying and mixing device, an atomizing device for spraying the starch with acid, a drum arranged to receive the acidulated starch from said conveying and mixing device formed with perforations, means within the drum for forcing the acidulated starch out through the perforations in the drum, and means for conveying the material so treated to the dextrinizing vessel.

12. In apparatus for manufacturing modified starches, the combination of a dextrinizing vessel, a combined conveying and mixing device, means for introducing acid and starch into the conveying and mixing device, a drum arranged to receive the acidulated starch from said conveying and mixing device formed with a plurality of slits extending longitudinally of the drum and in staggered relation, means within the drum for forcing the acidulated starch out through the perforations in the drum, and means for conveying the material so treated to the dextrinizing vessel.

13. In apparatus for manufacturing modified starches, the combination of a dextrinizing vessel, a conveying and mixing device, means for introducing acid and starch into the conveying and mixing device, a drum arranged to receive the acidulated starch from said conveying and mixing device formed with perforations, rotary beating elements within the drum which operate to force the acidulated starch out through said perforations, and means for conveying the material so treated to the dextrinizing vessel.

14. In apparatus for manufacturing modified starches, the combination of a dextrinizing vessel, a conveying and mixing device, means for introducing acid and starch into the conveying and mixing device in uniform proportions, a drum arranged to receive the acidulated starch from said conveying and mixing device formed with perforations, means within the drum for forcing the acidulated starch out through the perforations of the drum, and a conveyer arranged below the drum for receiving the acidulated starch and delivering the same to the dextrinizing vessel.

15. In apparatus for manufacturing modified starches, the combination of a dextrinizing vessel, a combined conveying and mixing device, means for introducing starch into the conveying and mixing device, an atomizing device for spraying said starch with an acid, a drum formed with slits which is arranged to receive the acidulated starch from the conveying and mixing device, rotary beaters arranged within said drum and adapted to force the material through said slits, and a conveyer arranged below the drum adapted to receive the material therefrom and convey the same to the dextrinizing vessel.

16. In apparatus for acidulating starch, the combination of means for proportionately mixing together starch and an acid, a perforated element, and means for forcing the mixed starch and acid through the perforations in said element.

17. In apparatus for acidulating starch, the combination of a screw conveyer, means for introducing starch into the conveyer, means for spraying acid upon the starch in the conveyer, a hollow element arranged to receive the starch and acid from the conveyer, the wall of which is formed with perforations, and a revoluble beater in said hollow element adapted to force the acidulated starch through the perforations in the wall of said element.

ADOLPH W. H. LENDERS.

Witnesses:
RICHARD RAUPERT,
C. W. BLOOMHALL.